(12) United States Patent  
Kusama

(10) Patent No.: US 7,976,008 B2  
(45) Date of Patent: Jul. 12, 2011

(54) SHEET FEEDER AND DOCUMENT SCANNER HAVING EJECTION DETECTING SENSOR

(75) Inventor: Takuro Kusama, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 18 days.

(21) Appl. No.: 12/567,000

(22) Filed: Sep. 25, 2009

(65) Prior Publication Data

US 2010/0078882 A1 Apr. 1, 2010

(30) Foreign Application Priority Data

Sep. 26, 2008 (JP) ................................. 2008-247716

(51) Int. Cl.
*B65H 85/00* (2006.01)
(52) U.S. Cl. .......... 271/3.17; 271/65; 271/212; 399/374
(58) Field of Classification Search .................. 271/31.7, 271/65, 212, 213, 3.71; 399/367, 374
See application file for complete search history.

(56) References Cited

U.S. PATENT DOCUMENTS

| | | | | |
|---|---|---|---|---|
| 5,634,632 | A * | 6/1997 | Furuya et al. ............... | 270/58.12 |
| 7,637,497 | B2 * | 12/2009 | Kusama ........................ | 271/186 |
| 7,665,728 | B2 * | 2/2010 | Kusama ........................ | 271/186 |
| 7,703,764 | B2 * | 4/2010 | Kusama ........................ | 271/186 |
| 7,717,424 | B2 * | 5/2010 | Sakakibara et al. ........... | 271/314 |
| 7,762,543 | B2 * | 7/2010 | Matsushima ................. | 271/3.14 |
| 2006/0285902 | A1 | 12/2006 | Horaguchi | |
| 2007/0210512 | A1 * | 9/2007 | Sakakibara et al. .......... | 271/314 |
| 2010/0079827 | A1 * | 4/2010 | Matsushima ................. | 358/498 |
| 2010/0080639 | A1 * | 4/2010 | Matsushima ................. | 399/371 |

FOREIGN PATENT DOCUMENTS

| | | |
|---|---|---|
| JP | 2001-312106 | 11/2001 |
| JP | 2005-331820 | 12/2005 |
| JP | 2006-347684 | 12/2006 |
| JP | 2007-238252 | 9/2007 |

* cited by examiner

*Primary Examiner* — Jeremy Severson
(74) *Attorney, Agent, or Firm* — Banner & Witcoff, Ltd.

(57) ABSTRACT

A sheet feeder includes a feed tray receiving sheets, a catch tray receiving the sheets ejected thereon, a feeding mechanism conveying the sheets from the feed tray to the catch tray, an ejection mode switching mechanism switching an ejection mode between a first mode in which the sheets are sequentially ejected on a stack of sheets already ejected and a second mode in which the sheets are sequentially ejected and inserted under a stack of sheets already ejected, an ejection detecting sensor detecting a sheet ejected on the catch tray, and a controller configured to, in response to an instruction to start feeding the sheets, forbid driving of the feeding mechanism when determining that the ejection mode is set to the second mode and determining with the ejection detecting sensor that a sheet is on the catch tray.

16 Claims, 7 Drawing Sheets

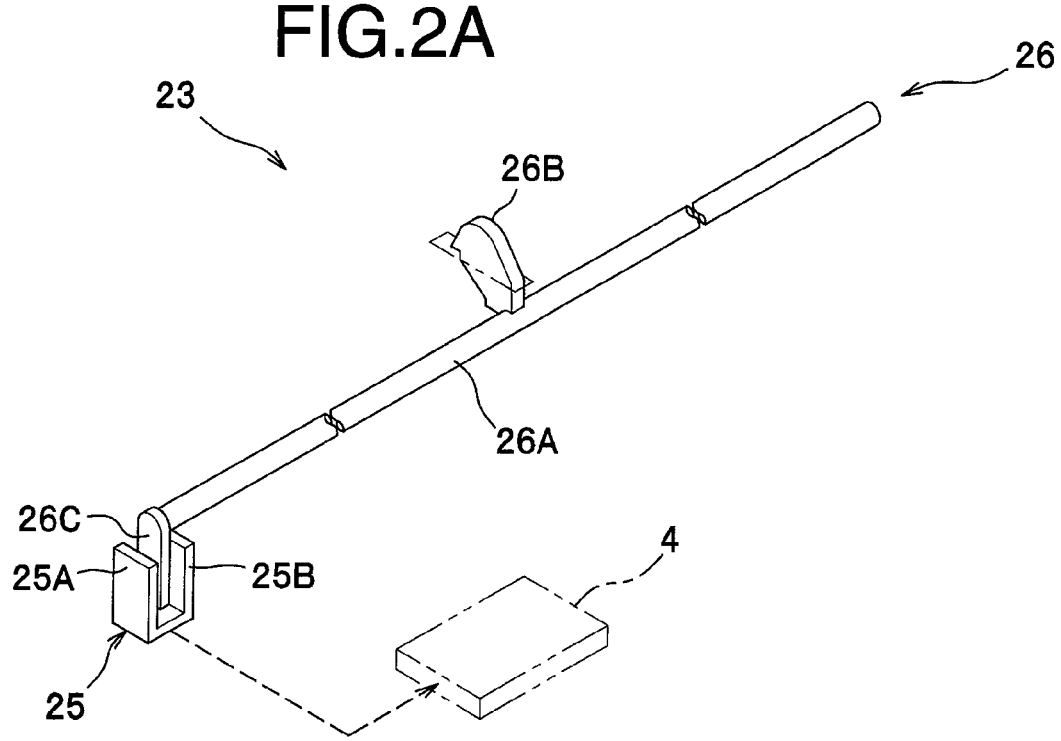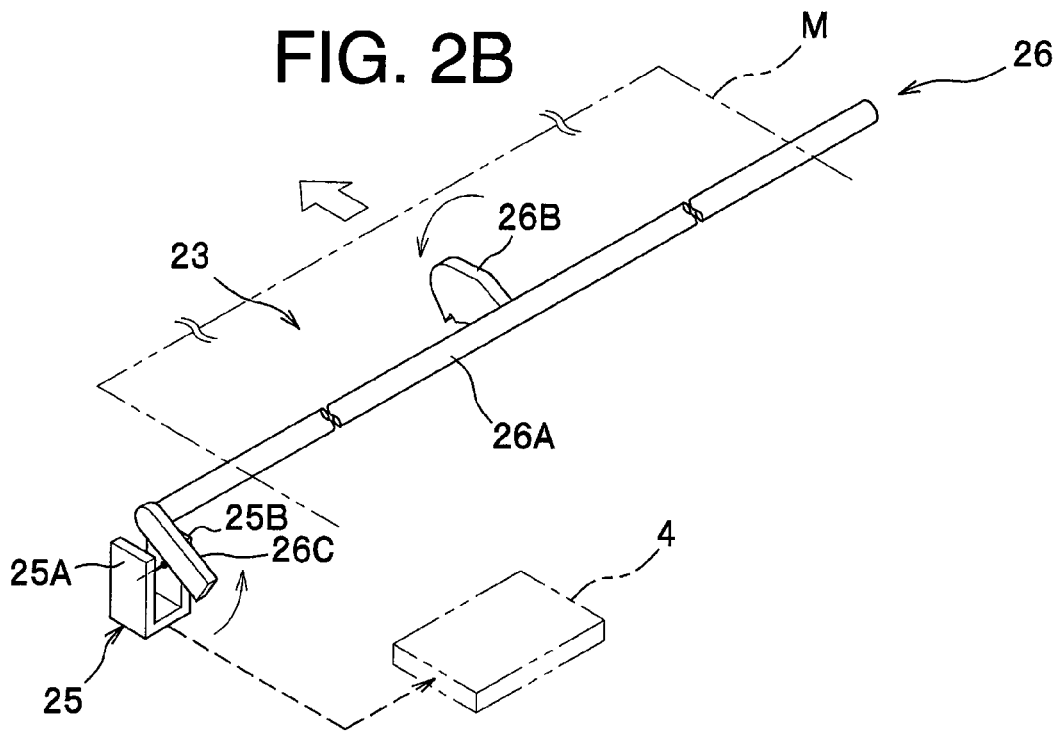

SHEET FEEDER AND DOCUMENT SCANNER HAVING EJECTION DETECTING SENSOR

CROSS-REFERENCE TO RELATED APPLICATION

This application claims priority under 35 U.S.C. §119 from Japanese Patent Application No. 2008-247716 filed on Sep. 26, 2008. The entire subject matter of the application is incorporated herein by reference.

BACKGROUND

1. Technical Field

The following description relates to one or more sheet feeders configured to feed a sheet from a feed tray to a catch tray.

2. Related Art

Document feeders, such as an Automatic Document Feeder (ADF), include the following two types. One is a stacking ejection type which is configured to sequentially eject and put document sheets onto sheets already stacked on a catch tray, and the other is an inserting ejection type which is configured to sequentially eject and insert document sheets under sheets already stacked on a catch tray (for example, see Japanese Patent Provisional Publications No. 2006-347684 and No. 2007-238252).

SUMMARY

Nowadays, document feeders configured to scan both faces of a document sheet have been proposed. Nevertheless, in a document feeder commonly configured with a feed tray and a catch tray arranged in the vertical direction, the order of pages of document sheets ejected on a catch tray is different between a single-side scanning mode and a double-side scanning mode. Thus, in this situation, a document feeder has been proposed, in which document sheets ejected can be placed on a catch tray in the same order of pages between the single-side scanning mode and the double-side scanning mode by switching an ejection mode between a stacking ejection mode and an inserting ejection mode.

In the meantime, in the inserting ejection mode, as the number of document sheets stacked on the catch tray increases, a frictional resistance generated when an ejected sheet is inserted under the stack of document sheets is increased. Thus, due to an increased frictional resistance, it is harder to insert a later ejected document sheet under a stack of sheets already ejected on the catch tray. Finally, an ejected sheet might not successfully be inserted under a stack of sheets already ejected on the catch tray, and it might cause a paper jam or the ejected sheet to be folded.

As one of possible solutions for the above problem, it is considered to restrict the number of document sheets settable on the feed tray to less than the maximum number of ejected sheets stackable on the catch tray. However, it is not an adequate solution for avoiding a paper jam or a folded sheet, since the number of document sheets actually set on the feed tray may exceed the maximum number of ejected sheets stackable on the catch tray when additional document sheets are set onto the feed tray during a sheet feeding operation or when a sheet feeding operation is launched with sheets to be removed being forgetfully left on the catch tray.

Aspects of the present invention are advantageous to provide one or more improved sheet feeders that make it possible to prevent a paper jam or a folded sheet in the inserting ejection mode in a user-friendly manner.

According to aspects of the present invention, a sheet feeder configured to feed sheets is provided, which includes a feed tray configured to receive the sheets to be fed, a catch tray configured to receive the sheets ejected thereon, a feeding mechanism configured to convey the sheets from the feed tray to the catch tray, an ejection mode switching mechanism configured to switch an ejection mode between a first mode and a second mode, the feeding mechanism ejecting, in the first mode, the sheets sequentially on a stack of sheets already ejected on the catch tray, the feeding mechanism ejecting, in the second mode, the sheets sequentially under a stack of sheets already ejected on the catch tray, an ejection detecting sensor configured to detect a sheet ejected on the catch tray, and a controller configured to take drive control of the feeding mechanism. The controller is configured to, in response to an instruction issued to start feeding the sheets, forbid driving of the feeding mechanism when determining that the ejection mode is set to the second mode and determining based on a detection result of the ejection detecting sensor that there is a sheet on the catch tray.

Furthermore, the controller may be configured to, in response to the instruction issued to start feeding the document sheets, drive the feeding mechanism when determining that the ejection mode is set to the first mode or determining based on the detection result of the ejection detecting sensor that there is no sheet on the catch tray.

In some aspects of the present invention, In the case where, when an instruction to start feeding the sheets is issued, it is determined that the ejection mode is set to the second mode and that there is a sheet on the catch tray, the feeding mechanism is not driven, and thus the sheet feeding is not started. Thereby, it is possible to prevent a paper jam or a folded sheet in the second mode (the inserting ejection mode).

Moreover, in some aspects, in the case where it is determined that a sheet is on the catch tray when the second mode (the inserting ejection mode) is active, the sheet feeding is not started, though in other cases, the feeding mechanism is driven to start feeding the sheets, according to the determination made by the controller of the sheet feeder. Hence, the user can use the sheet feeder as a user-friendly one without caring about which ejection mode is currently active and/or how many sheets are on the catch tray.

According to aspects of the present invention, further provided is a document scanning device, configured to scan document sheets, which includes a document feeder configured to feed the document sheets to be scanned. The document feeder includes a feed tray configured to receive the document sheets to be scanned, a catch tray configured to receive the document sheets ejected thereon, a feeding mechanism configured to convey the document sheets from the feed tray to the catch tray, an ejection mode switching mechanism configured to switch an ejection mode between a first mode and a second mode, the feeding mechanism ejecting, in the first mode, the document sheets sequentially on a stack of document sheets already ejected on the catch tray, the feeding mechanism ejecting, in the second mode, the document sheets sequentially under a stack of document sheets already ejected on the catch tray, an ejection detecting sensor configured to detect a document sheet ejected on the catch tray, and a controller configured to take drive control of the feeding mechanism. The controller is configured to, in response to an instruction issued to start feeding the document sheets, forbid driving of the feeding mechanism when determining that the ejection mode is set to the second mode and determining based on a detection result of the ejection detecting sensor that there is a document sheet on the catch tray.

In some aspects of the present invention, the document scanning device configured as above can provide the same effects as the aforementioned sheet feeder.

According to aspects of the present invention, further provided is a sheet feeder configured to be feed sheets, which includes a feed tray configured to receive the sheets to be fed, a catch tray configured to receive the sheets ejected thereon, a feeding mechanism configured to convey the sheets from the feed tray to the catch tray, an ejection mechanism configured to sequentially eject the sheets under a stack of sheets already ejected on the catch tray, an ejection detecting sensor configured to detect a sheet ejected on the catch tray; and a controller configured to take drive control of the feeding mechanism. The controller is configured to, in response to an instruction issued to start feeding the sheets, forbid driving of the feeding mechanism when determining based on a detection result of the ejection detecting sensor that there is a sheet on the catch tray.

In some aspects of the present invention, the sheet feeder configured as above can provide the same effects as the aforementioned sheet feeder and document scanning device.

BRIEF DESCRIPTION OF THE ACCOMPANYING DRAWINGS

FIG. 2A is a perspective view showing a configuration of an ejection detecting sensor in the embodiment according to one or more aspects of the present invention.

FIG. 2B is a perspective view illustrating an operation of the ejection detecting sensor in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
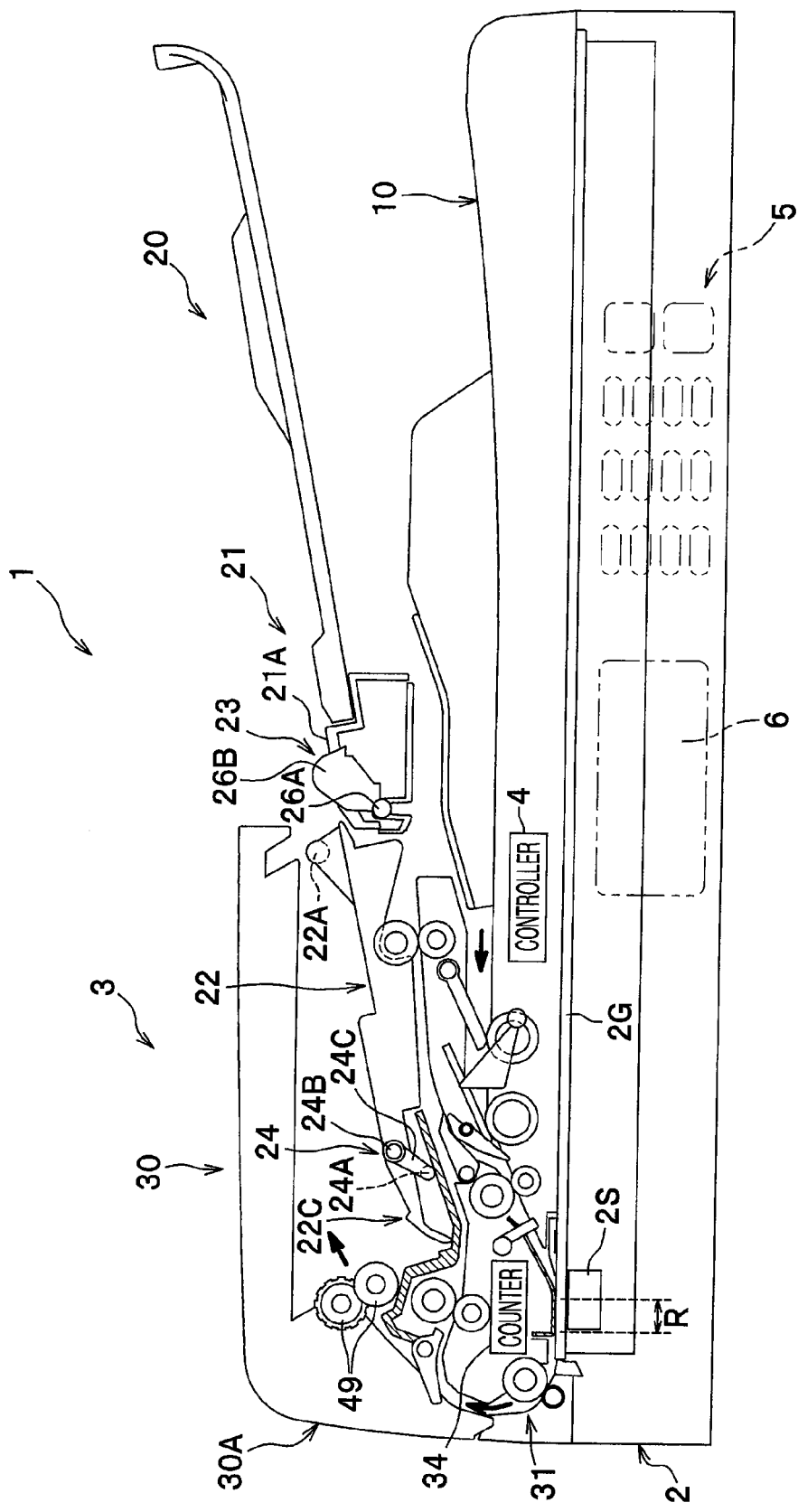
FIG. 1 is a cross-sectional side view showing an entire configuration of a document scanning device provided with a document feeder in an embodiment according to one or more aspects of the present invention.
Figure 3:
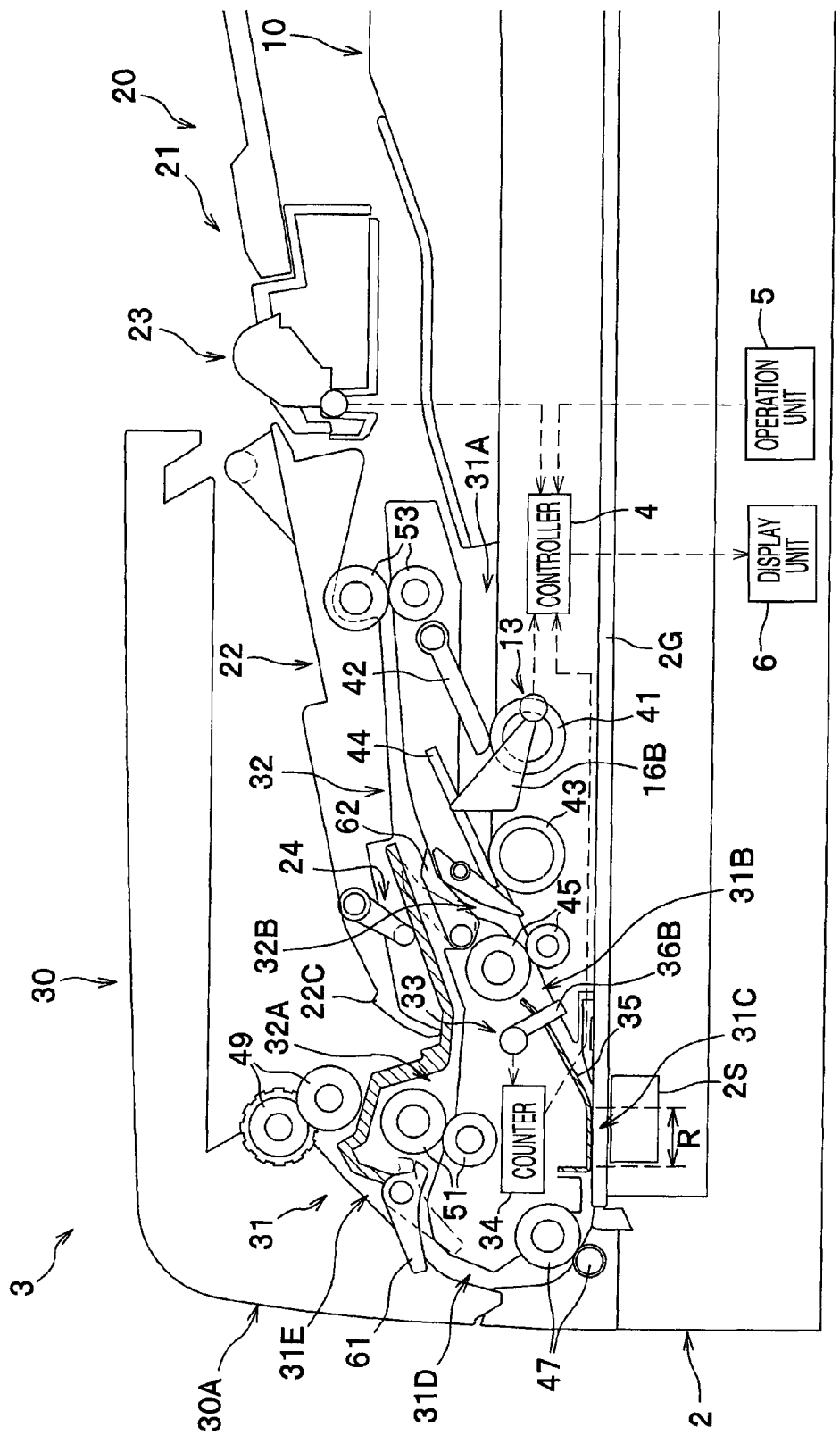
FIG. 3 is an enlarged view of a document feeder unit in the embodiment according to one or more aspects of the present invention.

Hereinafter, an embodiment according to aspects of the present invention will be described with reference to the accompany drawings. FIG. 1 shows an entire configuration of a document scanning device provided with a document feeder in an embodiment according to aspects of the present invention. FIG. 2A is a perspective view showing a configuration of a sheet ejection detecting sensor. FIG. 2B is a perspective view of the sheet ejection detecting sensor that illustrates an operation of the sheet ejection detecting sensor. FIG. 3 is an enlarged view of a document feeder unit.

In the following description, a "carrying direction" represents a direction in which a document sheet is conveyed from a feed tray 10 to a catch tray 20 (a direction indicated by arrows in FIG. 1). In addition, a "discharging direction" represents a direction in which a document sheet is ejected from a document feeder unit 30 to the catch tray 20. Further, an upstream side and a downstream side in the carrying direction and the discharging direction will simply be referred to as an "upstream side" and a "downstream side," respectively. A direction perpendicular to the carrying direction and the discharging direction (namely, a direction perpendicular to FIG. 1) will be referred to as a "width direction."

As illustrated in FIG. 1, a document scanning device 1 includes a flatbed scanner 2 with a known configuration, a document feeder 3 configured to convey a document sheet to a scanning position R, a controller 4 configured to control an operation of scanning the document sheet, an operation unit 5 configured to accept a user input therethrough, and a display unit 6 configured to display a message for the user.

<Configuration of Flatbed Scanner>

The flatbed scanner 2, disposed in a lower portion of the document scanning device 1, includes a platen glass 2G on which a document sheet is placed and an image sensor 2S. The flatbed scanner 2 is configured to scan and read the document sheet placed on the platen glass 2G and to scan a document sheet conveyed into the scanning position R.

<Configuration of Document Feeder>

The document feeder 3 is a device adapted to convey a document sheet to the scanning position R and to scan a single face or double faces of the document sheet in the scanning position R. The document feeder 3 is provided above the flatbed scanner 2 in a manner openable and closable relative to the platen glass 2G. The document feeder 3 includes the feed tray 10 on which document sheets are placed, the catch tray 20 onto which the document sheets are ejected, and the document feeder unit 30.

[Configuration of Catch Tray]

The catch tray 20, provided above the feed tray 10, includes a fixed tray 21 and a flap 22 disposed in an upstream side relative to the fixed tray 21. Further, the catch tray 20 is provided with an ejection detecting sensor 23. The fixed tray 21 is fixed not to move relative to the document feeder unit 30.

The flap 22 is supported by a main body frame 30A of the document feeder 3, swingably in the vertical direction relative to the fixed tray 21 around a swing shaft 22A provided in a downstream side relative to the flap 22. The flap 22 has a bending portion 22C formed to bend downward, at a distal end on an upstream side of the flap 22. In addition, a cam 24 engages with a distal end portion of the flap 22 on the upstream side of the flap 22.

The cam 24 includes a pushing-up bar 24A provided below the flap 22 so as to extend over between both ends of the flap 22 in the width direction, shafts 24B disposed on both ends of the flap 22, and a joint 24C configured to connect each of both ends of the pushing-up bar 24A with each shaft 24B. Each of the shafts 24B is pivotably supported by the main body frame 30A.

Figure 5:
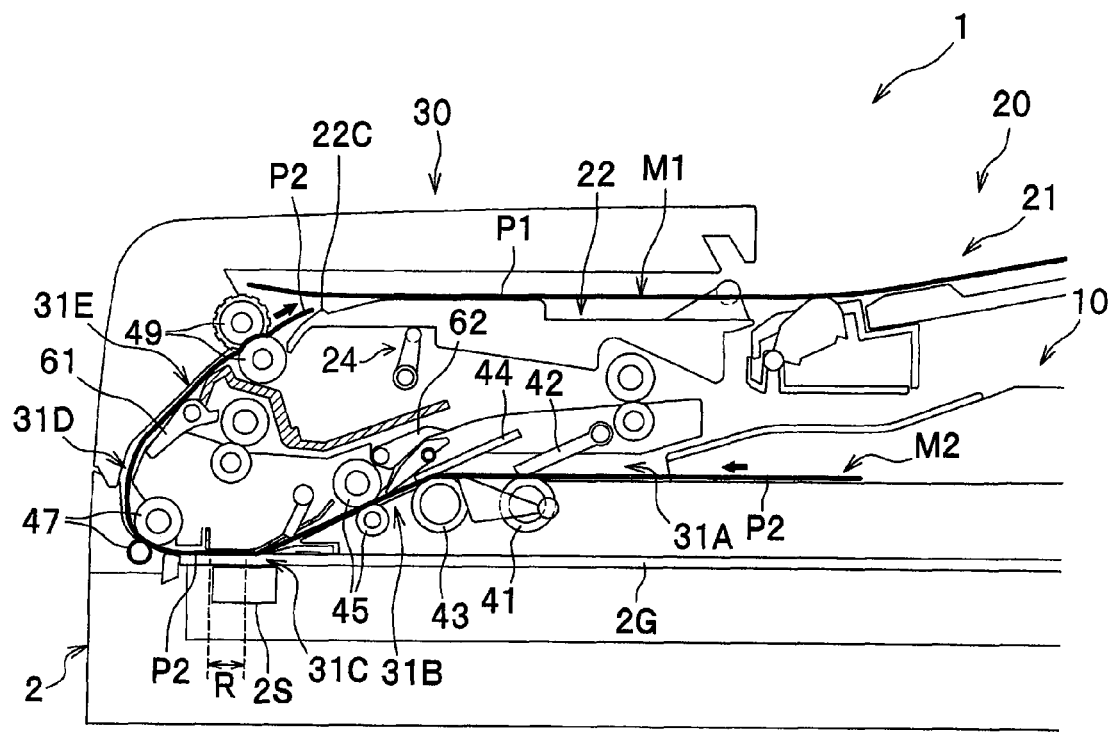
FIG. 5 is a schematic drawing illustrating an operation of the document feeder unit in a single-side scanning mode in the embodiment according to one or more aspects of the present invention.

The cam 24 is configured to swing the flap 22 between a state where the flap 22 is in a lower position as shown in FIG. 1 and a state where the flap 22 is in an upper position as shown in FIG. 5 when rotated in a clockwise or counterclockwise direction by a driving mechanism (not shown) controlled by the controller 4. Thereby, an ejection mode to eject document sheets is switched between below-mentioned two modes of a stacking ejection mode and an inserting ejection mode.

The ejection detecting sensor 23 is configured to detect a document sheet ejected on the catch tray 20, and provided to the fixed tray 21, which is located on a downstream side relative to the swing shaft 22A in the catch tray 20. As illustrated in FIG. 2A, the ejection detecting sensor 23 includes an optical sensor 25 and an actuator 26 swingably configured.

The optical sensor 25 is configured to detect a swing of the actuator 26. The optical sensor 25 includes a light emitting portion 25A configured to emit light and a light receiving portion 25B configured to receive the light emitted by the light emitting portion 25A. Further, the optical sensor 25 is adapted to issue, to the controller 4, a predetermined signal reflecting a change in the intensity of the light received by the light receiving portion 25B.

The actuator 26 includes a swing shaft 26A, a contact portion 26B, and a shielding portion 26C. The swing shaft 26A is disposed below a document loading surface 21A of the catch tray 20 (the fixed tray 21) (see FIG. 1), and rotatably attached to the fixed tray 21.

The contact portion 26B is provided substantially in a center of the swing shaft 26A in an axis line direction of the swing shaft 26A, and configured to establish contact with a document sheet ejected onto the catch tray 20. In a normal state (where any sheet does not contact the contact portion 26B), the contact portion 26B is partially protruded from the document loading surface 21A due to an action of an element (not shown) such as a spring and a plummet and exposed outside (see FIGS. 1 and 2A).

The shielding portion 26C is a plate-shaped member provided at an end of the swing shaft 26A. In the normal state, the shielding portion 26C is between the light emitting portion 25A and the light receiving portion 25B of the optical sensor 25 so as to block the light emitted by the light emitting portion 25A.

As illustrated in FIG. 2B, when a document sheet M ejected onto the catch tray 20 contacts the contact portion 26B, the contact portion 26B is pushed down due to the weight of the document sheet M and then the swing shaft 26A swings. Along with this operation, the shielding portion 26C evacuates from between the light emitting portion 25A and the light receiving portion 25B, and thereby the intensity of the light received by the light receiving portion 25B changes. At this time, the optical sensor 25 issues to the controller 4 a predetermined signal reflecting the change of the light intensity.

[Configuration of Document Feeder Unit]

As shown in FIG. 3, the document feeder unit 30 includes a carrying path 31 formed to guide a document sheet from the feed tray 10 to the catch tray 20 and a reversal path 32 formed to reverse the document sheet. Further, the document feeder unit 30 is provided with a feed detecting sensor 13, a passage detecting sensor 33, and a counter 34. It is noted that the feed detecting sensor 13 and the passage detecting sensor 33 are configured in the same manner as the aforementioned ejection detecting sensor 23. Therefore, detailed explanation of the feed detecting sensor 13 and the passage detecting sensor 33 will be omitted.

The carrying path 31 includes a suction path 31A formed to extend substantially horizontally from the feed tray 10, an oblique path 31B formed to extend obliquely downward from the suction path 31A, a horizontal path 31C formed to extend substantially horizontally from the oblique path 31B, a curved path 31D formed to extend in the shape of an arc upward from the horizontal path 31C, and an ejection path 31E formed to extend obliquely upward from the curved path 31D to the catch tray 20 (outside the carrying path 31). In the carrying path 31, a lower side of the horizontal path 31C is the scanning position R adapted to face the image sensor 2S via the platen glass 2G.

On the carrying path 31, there is a feeding mechanism provided to feed a document sheet from the feed tray 10 to the catch tray 20 via the scanning position R. The feeding mechanism includes a pickup roller 41, a pickup nipper 42, a separation roller 43, and a separation nipper 44, which are provided on the suction path 31A. The feeding mechanism further includes first feed rollers 45 provided on the oblique path 31B, second feed rollers 47 provided on the curved path 31D, and ejection rollers 49 provided on the ejection path 31E.

The pickup roller 41 and the pickup nipper 42 are configured to bring document sheets placed on the feed tray 10 to the separation roller 43. The separation roller 43 and the separation nipper 44 are configured to separate the document sheets fed by the pickup roller 41 and the pickup nipper 42 and to convey to the scanning position R the separated document sheets on a sheet-by-sheet basis. In addition, the first feed rollers 45 and the second feed rollers 47 are configured to feed the document sheets on the carrying path 31. Further, the ejection rollers 49 are configured to eject onto the catch tray 20 the document sheets completely scanned.

The feed detecting sensor 13 is configured to detect a document sheet placed on the feed tray 10. In the normal state as shown in FIG. 3, the feed detecting sensor 13 is set with a contact portion 16B protruding from the suction path 31A between the pickup roller 41 and the separation roller 43. In the feed detecting sensor 13, when document sheets are set on the feed tray 10, the contact portion 16B is pushed down by the weight of the document sheets to swing. Thereby, the intensity of light received by a light receiving portion of an optical sensor (not shown) changes. At this time, the optical sensor issues to the controller 4 a predetermined signal corresponding to the change in the light intensity.

The passage detecting sensor 33 is configured to detect passage of a document sheet being conveyed from the feed tray 10 to the catch tray 20. In the normal state as shown in FIG. 3, a swingable contact portion 36B is protruded from the oblique path 31B. A detailed explanation will be omitted, but based on detection outputs of the passage detecting sensor 33, the document scanning device 1 takes control as to whether to start scanning by the image sensor 2S or makes a determination as to whether a paper jam occurs on the carrying path 31.

The counter 34 is configured to count the number of document sheets conveyed from the feed tray 10 to the catch tray 20, and placed in an adequate position within the document feeder unit 30. The counter 34 is a known counter adapted to count the number of document sheets based on the detection outputs of the passage detecting sensor 33. The counter 34 transmits to the controller 4 the number of document sheets counted. It is noted that in the embodiment, for the sake of explanatory convenience, the counter 34 is shown separately from the controller 4, but the counter 34 may be included in the controller 4.

The reversal path 32 includes a first reversal path 32A and a second reversal path 32B. The first reversal path 32A is configured to diverge from the curved path 31D and extend toward the outside (rightward in FIG. 3). The second reversal path 32B is configured to diverge from substantially a center of the first reversal path 32A, extend obliquely downward, and join together with the oblique path 31B. On the reversal path 32, a reversal mechanism is provided, which is configured to feed and guide a document sheet in a reverse operation.

The reversal mechanism includes third feed rollers 51 and switchback rollers 53 that are provided on the first reversal path 32A, a first guide member 61 provided at a diverging portion between the curved path 31D and the first reversal path 32A, and a second guide member 62 provided at a diverging portion between the first reversal path 32A and the second reversal path 32B.

The third feed rollers 51 are configured to feed a document sheet on the first reversal path 32A. The switchback rollers 53 are configure to discharge a part of a document sheet to the outside. The first guide member 61 and the second guide member 62 are configured to be swingable and to switch a path on which a document sheet is to be conveyed.

<Configurations of Controller, Operation Unit, and Display Unit>

The controller 4 is provided with a CPU, a RAM, a ROM, and an input/output circuit (which are not shown), and placed in an adequate position within the document feeder 3. The controller 4 is configured to, based on programs and data stored on the ROM, changes in detection outputs of the feed detecting sensor 13 and the ejection detecting sensor 23, and outputs from the counter 34 and the operation unit 5, take control of driving the feeding mechanism, the reversal mechanism, and the image sensor 2S. Thus, the controller 4 takes control of an operation of scanning document sheets, and controls the display unit 6 to display messages for the user. The control of the scanning operation will be described below.

In the embodiment, when the shielding portion 26C of the ejection detecting sensor 23 is between the light emitting portion 25A and the light receiving portion 25B so as to block the light emitted by the light emitting portion 25A (see FIG. 2A), the controller 4 determines that there is no document sheet on the catch tray 20. Meanwhile, when the shielding portion 26C is away from between the light emitting portion 25A and the light receiving portion 25B such that the light receiving portion 25B receives the light emitted by the light emitting portion 25A (see FIG. 2B), the controller 4 determines that there is a document sheet on the catch tray 20. In addition, the controller 4 determines whether there is a document sheet on the feed tray 10, based on the detection output of the feed detecting sensor 13 in the same manner as the ejection detecting sensor 23.

In the embodiment, the operation unit 5 includes a plurality of operation buttons (see FIG. 1) through which the user operates the document scanning device 1. By operating the operation unit 5, the user can input an instruction to start scanning (that is, an instruction to start feeding for the document feeder 3) or select one of a single-side scanning mode (an inserting ejection mode) and a double-side scanning mode (a stacking ejection mode).

The display unit 6 is a liquid crystal display (LCD) configured to display messages (characters and signs) for the user (see FIG. 1). The display unit 6 displays a message to inform the user of a current state of the document scanning device 1, a message to inform the user of an error, and a message to prompt the user to make a selection.

<Operations of Document Scanning Device>

Figure 4A:
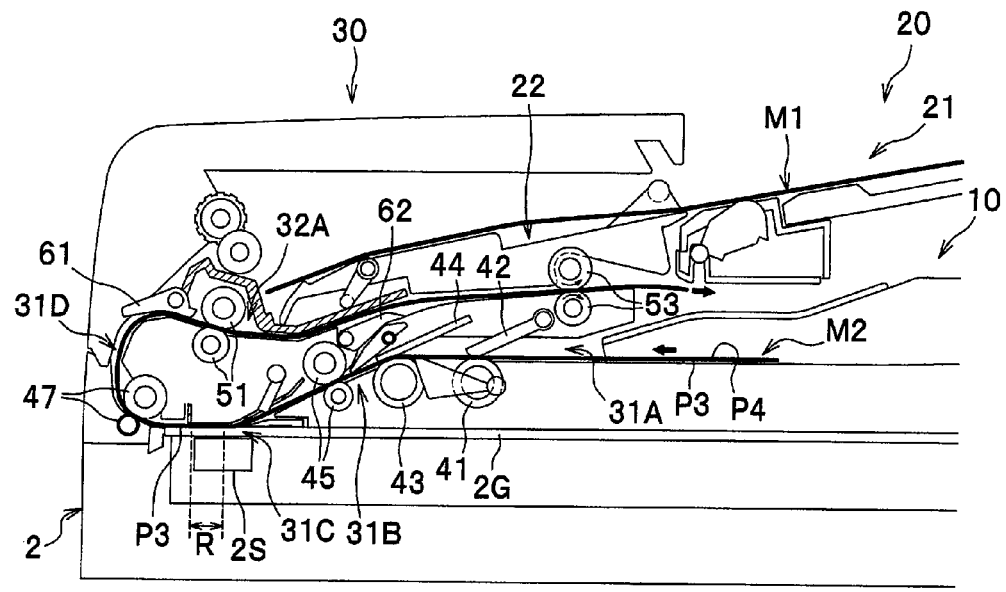
FIGS. 4A and 4B are schematic drawings illustrating an operation of the document feeder unit in a double-side scanning mode in the embodiment according to one or more aspects of the present invention.
Figure 4B:
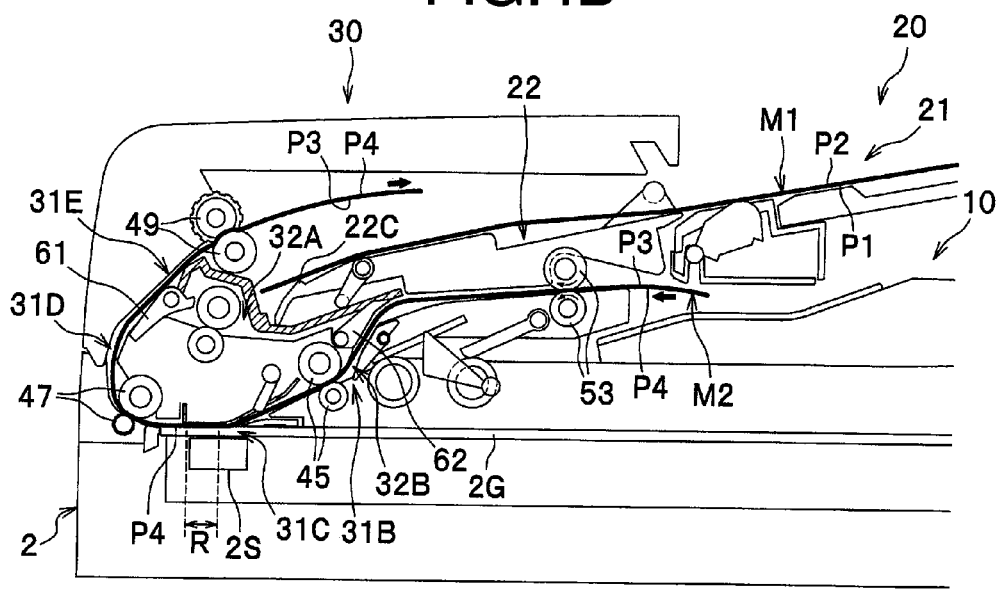

FIGS. 4A and 4B illustrate operations in the double-side scanning mode. FIG. 5 illustrates an operation in the single-side scanning mode.

[Operations in Double-Side Scanning Mode]

As illustrated in FIG. 4A, in the double-side scanning mode, a document sheet M2 is set on the feed tray 10 with a first scanned surface P3 facing down and a second scanned surface P4 facing up. Additionally, when the user operates the operation unit 5 and selects the double-side scanning mode, the flap 22 swings down, the first guide member 61 swings up, and the second guide member 62 swings down.

When the user inputs the instruction to start scanning, the document sheet M2 on the feed tray 10 is conveyed to the scanning position R by the separation roller 43 and the first feed rollers 45, and then the first scanned surface P3 is scanned. Thereafter, the document sheet M2 is conveyed on the curved path 31D by the second feed rollers 47, and fed along a lower surface of the first guide member 61 into the first reversal path 32A. Furthermore, the document sheet M2 is conveyed, by the third feed rollers 51 and the switchback rollers 53, on the first reversal path 32A toward the outside.

Almost completely the document sheet M2 is ejected from the switchback rollers 53, the switchback rollers 53 are temporarily stopped by a known control technique. At this time, as illustrated in FIG. 4B, the first scanned surface P3 of the document sheet M2 faces up and the second scanned surface P4 faces down. In addition, the first guide member 61 swings down and the second guide member 62 swings up such that a path for the document sheet M2 is switched.

Then, with the switchback rollers 53 being reversely rotated, the document sheet M2 is pulled back to the first reversal path 32A, and then fed along a lower surface of the second guide member 62 into the second reversal path 32B. Thus, the document sheet M2 is conveyed again to the oblique path 31B, and fed to the scanning position R by the first feed rollers 45 such that the second scanned surface P4 is scanned. After that, the document sheet M2 is conveyed on the curved path 31D and the ejection path 31E by the second feed rollers 47 and the ejection rollers 49, and then ejected onto the catch tray 20 with the first scanned surface P3 facing down and the second scanned surface P4 facing up.

In the state where the flap 22 is in the lower position, the bending portion 22C of the flap 22 is located below the ejection rollers 49. Therefore, a rear end of an already ejected document sheet M1 loaded on the bending portion 22C is located lower than the ejection rollers 49. Thereby, the document sheet M2 later ejected is put onto or stacked on top of the document sheet M1 already ejected on the catch tray 20. The ejection mode at this time is referred to as the stacking ejection mode.

In the stacking ejection mode, document sheets are sequentially ejected on a stack of document sheets already ejected with first scanned surfaces facing down and second scanned surfaces facing up. Therefore, the document sheets M1 and M2 are placed on the catch tray 20 in the order of pages P1, P2, P3, and P4 from the bottom. The order of the pages is the same as that in the case where the documents M1 and M2 are loaded on the feed tray 10.

[Operations in Single-Side Scanning Mode]

As illustrated in FIG. 5, in the single-side scanning mode, the document sheet M2 is set on the feed tray 10 with the scanned surface P2 facing down. Further, when the user selects the single-side scanning mode through the operation unit 5, the flap 22 swings up and the first guide member 61 swings down.

When the user inputs the instruction to start scanning, the document sheet M2 on the feed tray 10 is conveyed to the scanning position R by the separation roller 43 and the first feed rollers 45, and then the scanned surface P2 is scanned. Thereafter, the document sheet M2 is fed on the curved path 31D and the ejection path 31E by the second feed rollers 47 and the ejection rollers 49, and then ejected onto the catch tray 20 with the scanned surface P2 facing up.

In the state where the flap 22 is in the upper position, the bending portion 22C of the flap 22 is located above a position where the two ejection rollers 49 nip a sheet. Therefore, a rear end of the document sheet M1 already ejected and placed on the flap 22, is located above the position where the two ejection rollers 49 nip a sheet. Thereby, the later ejected document sheet M2 establishes contact, from below, with the rear end of the document sheet M1 already ejected on the catch tray 20, and then is ejected and inserted under the document sheet M1. The ejection mode at this time is referred to as the inserting ejection mode.

In the inserting ejection mode, document sheets are sequentially ejected and inserted under a stack of document sheets already ejected, with scanned surfaces thereof facing up. Therefore, the document sheets M1 and M2 are placed on the catch tray 20 in the order of the pages P1 and P2 from the top. The order of the pages is the same as that in the case where the document sheets M1 and M2 are loaded on the feed tray 10.

[Document Scanning Control by Controller]

Figure 6:
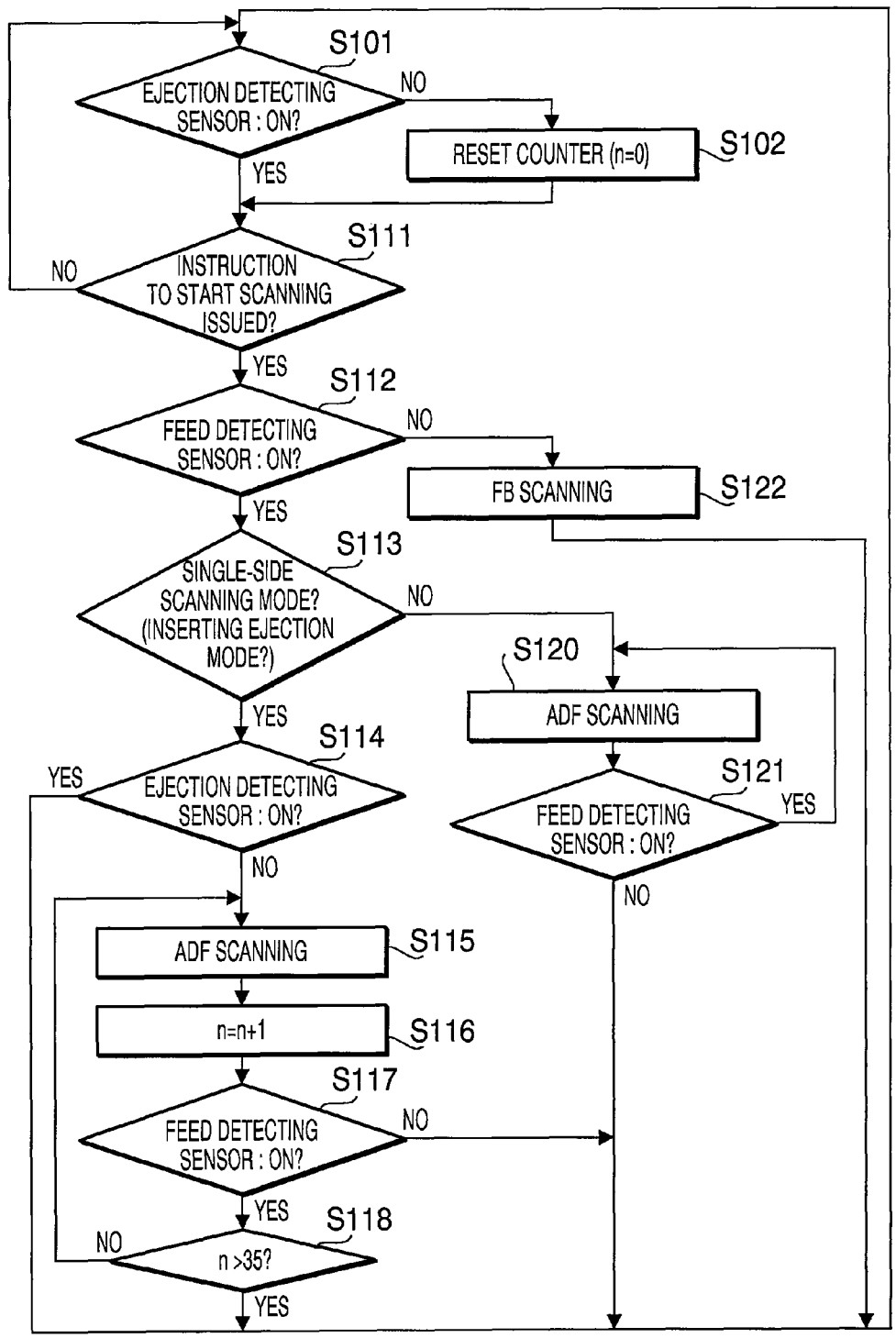
FIG. 6 is a flowchart showing a procedure of document scanning control to be taken by a controller of the document scanning device in the embodiment according to one or more aspects of the present invention.

Subsequently, document scanning control (document feeding control) by the controller 4 will be described. FIG. 6 is a flowchart of the document scanning control to be taken by the controller 4.

In the following description, a "predetermined value" is a value set within such a range that a document sheet to be ejected on the catch tray 20 can be inserted under a stack of document sheets already ejected. In the embodiment, the "predetermined value" corresponds to the number of document sheets allowed to be ejected on the catch tray 20 in the inserting ejection mode. The "predetermined value" is previously set and stored on the ROM of the controller 4. The embodiment will give an example in which the number of document sheets allowed to be ejected on the catch tray 20 is set to 35 (namely, the predetermined value is set to 35). However, the predetermined value is not limited to 35, and may be set to any other adequate value.

It is noted that in FIG. 6, "... DETECTING SENSOR ON" denotes a state where the light receiving portion of an optical sensor is receiving light emitted by the light emitting portion of the optical sensor. Therefore, "... DETECTING SENSOR ON?: Yes" represents a state where a document sheet is on a corresponding tray, whereas " ... DETECTING SENSOR ON?: No" represents a state where the document sheet is not on the tray. Additionally, "FB scanning" denotes an operation of scanning a document sheet placed on the platen glass 2G, and "ADF scanning" denotes an operation of scanning a document sheet conveyed by the document feeder 3 from the feed tray 10 to the scanning position R.

The controller 4 continuously performs operations shown in FIG. 6. Initially, when the instruction to start scanning is inputted by a user operation through the operation unit 5 (S111: Yes), the controller 4 determines whether there is a document sheet set on the feed tray 10, based on the detection output of the feed detecting sensor 13 (S112).

When it is determined that there is a document sheet on the feed tray 10 (S112: Yes), the controller 4 determines whether the single-side scanning mode (the inserting ejection mode) is selected (S113). Here, the determination as to whether the single-side scanning mode (the inserting ejection mode) is selected is made based on data stored on the RAM of the controller 4 when the user previously selects one of the double-side scanning (the stacking ejection mode) and the single-side scanning (the inserting ejection mode) before the user issues the instruction to start scanning through the operation unit 5.

When the single-side scanning mode (the inserting ejection mode) is selected (S113: Yes), the controller 4 determines whether there is a document sheet on the catch tray 20, based on the detection output of the ejection detecting sensor 23 (S114). When it is determined that there is not a document sheet on the catch tray 20 (S114: No), the controller 4 drives the feeding mechanism to feed the document sheet from the feed tray 10 to the scanning position R, and performs an operation of scanning the document sheet (ADF scanning) (S115). Then, the counter 34 increments the number of document sheets by one or adds one to a value "n" that the counter indicates (S116). It is noted that since the document sheet completely scanned is ejected onto the catch tray 20 by the feeding mechanism, the state where there is a document sheet on the catch tray 20 (EJECTION DETECTING SENSOR ON) is established after the ADF scanning of the document sheet is completed.

Thereafter, the controller 4 again determines, based on the detection output of the feed detecting sensor 13, whether there is a document sheet on the feed tray 10 (S117). When it is determined that there is not a document sheet on the feed tray 10 (S117: No), it means that there is no document sheet to be scanned. Thus, in this case, the controller 4 advances to S101 without driving the feeding mechanism (at least the pickup roller 41 or the separation roller 43) (namely, without performing the ADF scanning). Meanwhile, when it is determined that there is a document sheet on the feed tray 10 (S117: Yes), the controller 4 determines whether the value "n" is greater than 35 that is the predetermined value (S118).

When the value "n" is greater than 35 (S118: Yes), the controller 4 advances to S101 without driving the feeding mechanism (at least the pickup roller 41 or the separation roller 43) (namely, without performing the ADF scanning). Meanwhile, when the value "n" is not greater than 35 (S118: No), the controller 4 goes back to S115, and keeps performing the ADF scanning until the value "n" exceeds 35 (namely, repeatedly executes the steps of S115 to S118).

When it is determined in S114 that there is a document sheet on the catch tray 20 (S114: Yes), the controller 4 does not drive the feeding mechanism (at least the pickup roller 41 or the separation roller 43). Further, at this time, a message for informing the user that a document sheet is on the catch tray 20 or a message for prompting the user to remove the document sheet on the catch tray 20 may be displayed. Thereafter, the controller 4 goes to S101.

When it is determined in S113 that the single-side scanning mode (the inserting ejection mode) is not selected (S113: No), namely, when the double-side scanning mode (the stacking ejection mode) is selected, the controller 4 drives the feeding mechanism and performs the ADF scanning without making a determination based on the detection output of the feed detecting sensor 23 (S120). The document sheet completely scanned is ejected onto the catch tray 20 by the feeding mechanism. Thus, after the ADF scanning of the document sheet is completed, the state where there is a document sheet on the catch tray 20 (EJECTION DETECTING SENSOR ON) is established.

After that, the controller 4 again determines, based on the detection output of the feed detecting sensor 13, whether there is a document sheet on the feed tray 10 (S121). When it is determined that there is not a document sheet on the feed tray 10 (S121: No), it means that there is no document sheet to be scanned on the feed tray 10, and thus the controller 4 goes to S101 without driving the feeding mechanism (at least the pickup roller 41 or the separation roller 43) (namely, without performing the ADF scanning). Meanwhile, when it is determined that there is a document sheet on the feed tray 10 (S121: Yes), it means that there is a subsequent document sheet to be scanned on the feed tray 10. In this case, the controller 4 goes back to S120, and keeps performing the ADF scanning until no document sheet remains on the feed tray 10 (namely, repeatedly performs the steps of S120 and S121).

When it is determined in S112 that there is not a document sheet on the feed tray (S112: No), it means that no document sheet is set on the feed tray 10, and thus the controller 4 drives the image sensor 2S to scan and performs an operation of scanning a document sheet placed on the platen glass 2G (FB scanning) (S122). The controller 4 goes to S101 after completing the FB scanning.

In S101, the controller 4 determines, based on the detection output of the feed detecting sensor 23, whether there is a document sheet on the catch tray 20 (S101). When it is determined that there is a document sheet on the catch tray 20 (S101: Yes), the controller 4 advances to S111, and periodically determines whether there is a document sheet on the catch tray 20, until the instruction to start scanning is inputted (S111: No).

When it is determined that there is not a document sheet on the catch tray (S101: No), it means that document sheets are completely removed from the catch tray 20, and thus the controller 4 resets the value "n" indicated by the counter 34 to "0" (n=0) (S102). Thereafter, the controller 4 goes to S111, and periodically determines whether there is a document sheet on the catch tray 20, until the instruction to start scanning is inputted (S111: No).

While the controller 4 is repeatedly performing the steps S111, S101, and S102, the document scanning device 1 is in a standby state. It is noted that the step S101 may be set to be executed immediately after the controller 4 goes to S101. Further, the step S101 may be set to be executed after a lapse of a predetermined time after the controller 4 goes to S101. Furthermore, the document scanning control illustrated in FIG. 6 may be adapted such that when it is determined in S114 that there is a document sheet on the catch tray 20 (S114: Yes), the controller 4 may go to S111.

The embodiment set forth as above can present the following effects. When the instruction to start scanning (to start feeding) is inputted, and it is determined that the single-side scanning (the inserting ejection mode) is set active and that there is a document sheet on the catch tray 20, based on the detection output of the ejection detecting sensor 23, the feeding mechanism is not driven. Namely, in this case, a document feeding is not started. Thus, it is possible to prevent a folded sheet and a paper jam in the inserting ejection mode.

Additionally, only in the case where it is determined that the inserting ejection mode is set active and that there is a document sheet on the catch tray 20, document feeding is not started. In other cases, the controller 4 drives the feeding mechanism and starts feeding document sheets based on its own determination. Hence, the user can use the document scanning device 1 (the document feeder 3) without having to care about which ejection mode is currently selected and how many document sheets are loaded on the catch tray 20. Thereby, it is possible to present the document scanning device 1 (the document feeder 3) as a user-friendly and convenient device.

In the case where the double-side scanning mode (the stacking ejection mode) is selected through the operation unit 5 when the instruction to start scanning is inputted, the controller 4 drives the feeding mechanism without making a determination based on the detection output of the ejection detecting sensor 23. Accordingly, it is possible to shorten a processing time period taken by the controller 4. Thus, it is possible to shorten a time period taken for the document scanning (the document feeding), and therefore it is possible to present the document scanning device 1 (the document feeder 3) as a more user-friendly and convenient device.

The ejection detecting sensor 23 is provided to the fixed tray 21, of the catch tray 20, which is located in the downstream side relative to the swing shaft 22A of the flap 22 and fixed not to move relative to the document feeder unit 30. Therefore, compared with the ejection detecting sensor 23 being provided to the flap 22 vertically swingable, the occurrence of failures of the ejection detecting sensor 23 such as wrong detection and malfunction is relatively reduced. Thereby, malfunction of the document feeder 3 (the document scanning device 1) can be reduced and thus it is possible to present the document feeder 3 (the document scanning device 1) as a more user-friendly device.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, the flap 22 and the cam 24 are exemplified as a mechanism for switching the ejection mode. However, for example, the mechanism for switching the ejection mode may be the flap 22 configured to vertically swing, without the cam 24, by a driving force transmitted to the swing shaft 22A. Further, the ejection mode can be switched by vertically moving an upstream end of a document loading surface of the catch tray 20 relative to the ejection rollers 49. Therefore, for instance, the mechanism for switching the ejection mode may be a mechanism configured to vertically move the position where the two ejection rollers 49 nip a document sheet by shifting at least one of the two ejection rollers 49.

In the aforementioned embodiment, the determination as to whether the stacking ejection mode is selected (which corresponds to S113) is made based on the data stored when the user selects, through the operation unit 5, one of the double-side scanning mode (the stacking ejection mode) and the single-side scanning mode (the inserting ejection mode). However, for example, the determination as to whether the stacking ejection mode is selected may be made based on a detection output of a sensor provided to detect the position (the upper position or the lower position) of the flap 22.

Figure 7:
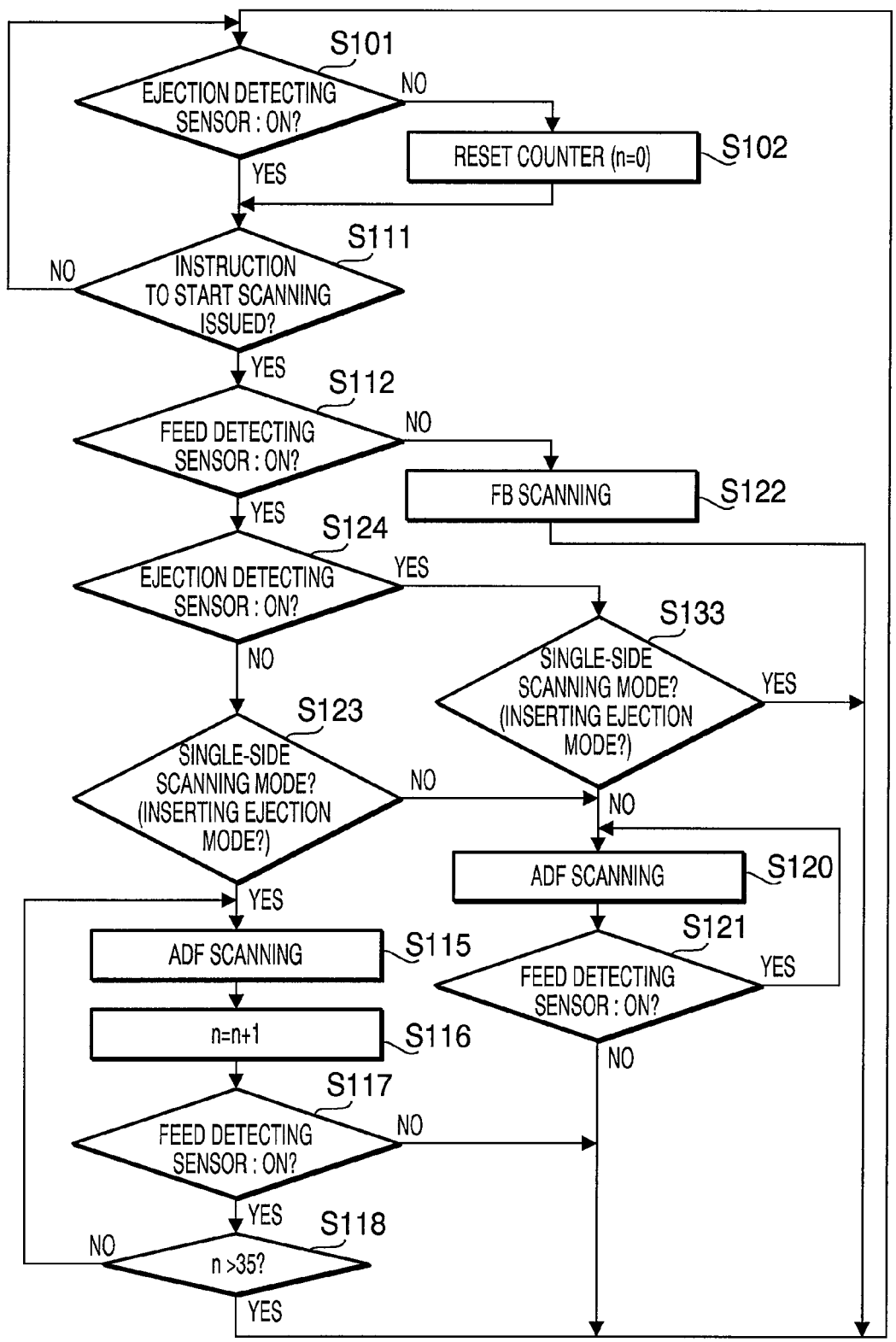
FIG. 7 is a flowchart showing a procedure of document scanning control to be taken by the controller of the document scanning device in a modification according to one or more aspects of the present invention.

According to the aforementioned embodiment, in the document scanning control by the controller 4, after it is determined whether the single-side scanning mode (the inserting ejection mode) is selected (S113), it is determined whether there is a document sheet on the catch tray 20 (S114). However, for example, as a modification shown in FIG. 7, the document scanning control may be adapted to, after determining whether there is a document sheet on the catch tray 20 based on the detection output of the ejection detecting sensor 23 (S124), determine whether the single-side scanning mode (the inserting ejection mode) is selected (S123 and S133).

In the aforementioned embodiment, the operation unit 5 configured with a plurality of operation buttons is exemplified as a solution for inputting the instruction to start scanning (to start feeding). However, for example, the solution for inputting the instruction to start scanning (to start feeding) may be a touch panel. Furthermore, the solution for inputting the instruction to start scanning (to start feeding) is not limited to an element provided in the document scanning device 1, and for example, may be a personal computer or a remote controller provided outside the document scanning device 1.

In the aforementioned embodiment, the present invention is applied to the document feeder 3 with the catch tray 20 disposed above the feed tray 10. However, the present invention may be applied to a document feeder with a catch tray disposed below the feed tray.

In the aforementioned embodiment, the stacking ejection mode is set in the double-side scanning mode, and the inserting ejection mode is set in the single-side scanning mode. However, for example, when the catch tray is provided below the feed tray, it is desired that the stacking ejection mode is set in the single-side scanning mode, and that the inserting ejection mode is set in the double-side scanning mode. Namely, the combination of the scanning mode and the ejection mode may be adequately set depending on the positional relationship between the feed tray and the catch tray. Further, independently of the scanning mode, the ejection mode may arbitrarily be switched by the user.

Further, a known detecting sensor may be employed as substitute for each of the detecting sensors shown in the aforementioned embodiment. Moreover, the detecting sensors may have respective different configurations.

The aforementioned embodiment exemplifies the feeding mechanism and the reversal mechanism, but the configurations thereof may adequately be modified, for instance, with respect to the number or the location of rollers. Further, the configuration (cross-sectional structure) of the carrying path 31 or the reversal path 32 may adequately be modified, depending on the positional relationship between the feed tray and the catch tray or the shape or size of the document feeder unit 30.

What is claimed is:

1. A sheet feeder configured to feed sheets, comprising:
a feed tray configured to receive the sheets to be fed;
a catch tray configured to receive the sheets ejected thereon;
a feeding mechanism configured to convey the sheets from the feed tray to the catch tray;
an ejection mode switching mechanism configured to switch an ejection mode between a first mode and a second mode, the feeding mechanism ejecting, in the first mode, the sheets sequentially on a stack of sheets already ejected on the catch tray, the feeding mechanism ejecting, in the second mode, the sheets sequentially under a stack of sheets already ejected on the catch tray;
an ejection detecting sensor configured to detect a sheet ejected on the catch tray; and
a controller configured to control the feeding mechanism, wherein the controller is configured to, in response to an instruction issued to start feeding the sheets, forbid driving of the feeding mechanism when determining that the ejection mode is set to the second mode and determining based on a detection result of the ejection detecting sensor that there is a sheet on the catch tray.

2. The sheet feeder according to claim 1, wherein the controller is configured to, in response to the instruction issued to start feeding the sheets, drive the feeding mechanism when determining that the ejection mode is set to the first mode or determining based on the detection result of the ejection detecting sensor that there is no sheet on the catch tray.

3. The sheet feeder according to claim 2, wherein the controller is configured to, in response to the instruction issued to start feeding the sheets, when determining that the ejection mode is set to the first mode, drive the feeding mechanism without determining based on the detection result of the ejection detecting sensor whether there is a sheet on the catch tray.

4. The sheet feeder according to claim 1, further comprising a selecting unit configured to accept therethrough a selection of the ejection mode between the first mode and the second mode.

5. The sheet feeder according to claim 1,
wherein the catch tray is disposed above the feed tray,
wherein the catch tray comprises a fixed tray fixed relative to the feeder, and the feeding mechanism,
wherein the feeding mechanism comprises:
a swing shaft provided at an upstream side relative to the fixed tray in a sheet ejection direction in which a sheet is ejected on the catch tray; and
a flap provided at an upstream side relative to the swing shaft in the sheet ejection direction, the flap being configured to swing in a vertical direction around the swing shaft so as to switch the ejection mode between the first mode and the second mode.

6. The sheet feeder according to claim 5, wherein the ejection detecting sensor is provided to the fixed tray.

7. The sheet feeder according to claim 1, wherein the ejection detecting sensor comprises:
an actuator configured to swing when contacting a sheet ejected on the catch tray; and
a swing detecting sensor configured to detect a swinging motion of the actuator.

8. The sheet feeder according to claim 7, wherein the actuator comprises:
a swing shaft provided below a sheet loading surface of the catch tray; and
a contact portion configured to protrude from the sheet loading surface of the catch tray so as to contact a sheet ejected on the catch tray.

9. A document scanning device configured to scan document sheets, comprising a document feeder configured to feed the document sheets to be scanned,
wherein the document feeder comprises:
a feed tray configured to receive the document sheets to be scanned;
a catch tray configured to receive the document sheets ejected thereon;
a feeding mechanism configured to convey the document sheets from the feed tray to the catch tray;
an ejection mode switching mechanism configured to switch an ejection mode between a first mode and a second mode, the feeding mechanism ejecting, in the first mode, the document sheets sequentially on a stack of document sheets already ejected on the catch tray, the feeding mechanism ejecting, in the second mode, the document sheets sequentially under a stack of document sheets already ejected on the catch tray;

an ejection detecting sensor configured to detect a document sheet ejected on the catch tray; and a controller configured to control the feeding mechanism, wherein the controller is configured to, in response to an instruction issued to start feeding the document sheets, forbid driving of the feeding mechanism when determining that the ejection mode is set to the second mode and determining based on a detection result of the ejection detecting sensor that there is a document sheet on the catch tray.

10. The document scanning device according to claim 9, wherein the controller is configured to, in response to the instruction issued to start feeding the document sheets, drive the feeding mechanism when determining that the ejection mode is set to the first mode or determining based on the detection result of the ejection detecting sensor that there is no document sheet on the catch tray.

11. The document scanning device according to claim 10, wherein the controller is configured to, in response to the instruction issued to start feeding the document sheets, when determining that the ejection mode is set to the first mode, drive the feeding mechanism without determining based on the detection result of the ejection detecting sensor as to whether there is a document sheet on the catch tray.

12. The document scanning device according to claim 9, further comprising a selecting unit configured to accept therethrough a selection of the ejection mode between the first mode and the second mode.

13. The document scanning device according to claim 9, wherein the catch tray is disposed above the feed tray, wherein the catch tray comprises a fixed tray fixed relative to the document feeder, and the feeding mechanism, wherein the feeding mechanism comprises:

a swing shaft provided at an upstream side relative to the fixed tray in a sheet ejection direction in which a document sheet is ejected on the catch tray; and a flap provided at an upstream side relative to the swing shaft in the sheet ejection direction, the flap being configured to swing in a vertical direction around the swing shaft so as to switch the ejection mode between the first mode and the second mode.

14. The document scanning device according to claim 13, wherein the ejection detecting sensor is provided to the fixed tray.

15. The document scanning device according to claim 9, wherein the ejection detecting sensor comprises:

an actuator configured to swing when contacting a document sheet ejected on the catch tray; and a swing detecting sensor configured to detect a swinging motion of the actuator.

16. The document scanning device according to claim 15, wherein the actuator comprises:

a swing shaft provided below a document loading surface of the catch tray; and a contact portion configured to protrude from the document loading surface of the catch tray so as to contact a document sheet ejected on the catch tray.

* * * * *